United States Patent Office 2,840,593
Patented June 24, 1958

2,840,593

FLUORINE CONTAINING DIESTERS OF CAMPHORIC ACID

Earl E. Sommers, Wilmington, Del., and Bernard M. Sturgis, Pitman, N. J., assignors to E. I. du Pont de Nemours and Company, Wilmington, Del., a corporation of Delaware No Drawing. Application May 11, 1956
Serial No. 584,161

4 Claims. (Cl. 260—468)

This invention relates to new compounds which are fluorine containing diesters of camphoric acid. These compounds are useful as stable fluids which have utility as high temperature lubricants and as fluids for power and heat transmission. In particular, the new compounds of this invention are diesters produced by esterifying camphoric acid with telomer alcohols obtained from tetrafluoroethylene and lower alkyl non-tertiary aliphatic alcohols according to the following:

I. PREPARATION TELOMER ALCOHOL

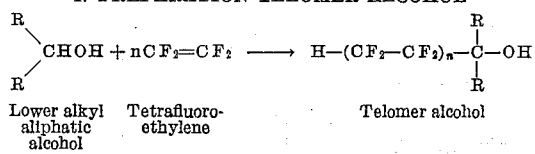

Lower alkyl aliphatic alcohol    Tetrafluoroethylene    Telomer alcohol

II. ESTERIFICATION OF CAMPHORIC ACID

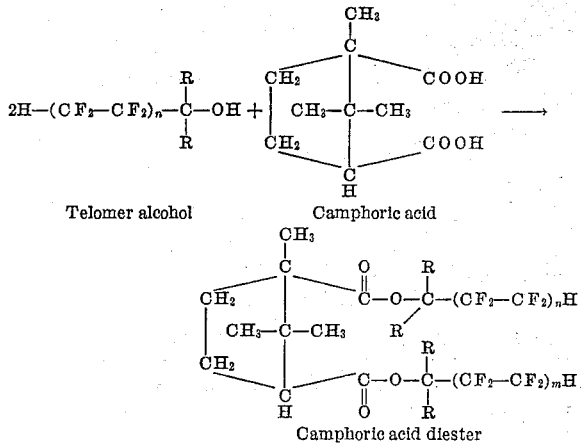

Telomer alcohol    Camphoric acid

Camphoric acid diester

The problem of obtaining satisfactory high temperature lubricants is particularly difficult because of the many properties required by the lubricant. For example, the lubricant should be stable to temperatures over 250° C. and form no sludge on continued use. It should be liquid over a wide range of temperatures; e. g., from below room temperature to above the high temperatures at which it will be used. In addition, the lubricant should have good stability at high temperatures in the presence of oxygen and water, i. e., it should have oxidative and hydrolytic stability at elevated temperatures. The lubricant should be non-corrosive to the metal surfaces which it lubricates. It should not thicken on continued use; i. e., it should have good viscosity stability. A further requirement is that it should not evaporate on continued use; thus, it should have low volatility. In addition to all these requirements, the chemical intermediates from which the lubricant is made should be readily available and low in cost and the process by which the composition is made should be economically feasible.

The camphoric acid esters of the present invention possess surprising beneficial properties of high temperature oxidative stability, low volatility and superior hydrolytic stability; said esters have good viscosity characteristics and of course camphoric acid is readily available.

It is an object of this invention to provide new compounds which have surprising superior hydrolytic stability, volatility and oxidative stability characteristics.

It is an object of this invention to provide new compounds which are stable and have utility as high temperature lubricants. More particularly, it is an object of this invention to produce new diesters by esterifying camphoric acid with telomer alcohols obtained from tetrafluoroethylene and lower alkyl non-tertiary aliphatic alcohols.

The compounds of the present invention have the following structure

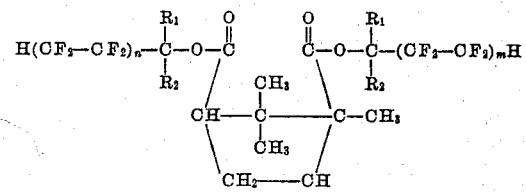

where $R_1$ and $R_2$ are H, methyl, or ethyl and the sum of the carbon atoms in $R_1$ and $R_2$ is not greater than 2; and $n$ and $m$ are integers whose sum is from 4 to 8.

The compounds of this invention are obtained, as already indicated, by esterifying camphoric acid with a fluorine containing telomer alcohol. The telomer alcohols and their preparation are described in U. S. 2,559,628 (Joyce to Du Pont issued July 10, 1951). The alcohols useful in this invention are obtained according to this patent by heating tetrafluoroethylene with a primary or secondary alcohol which contains from 1 to 3 carbon atoms, preferably in a closed system, and in the presence of a peroxy or azo catalyst. In this way saturated polyfluoro organic compounds are obtained which contain alcoholic hydroxyl groups and which contain at least one or more tetrafluoroethylene units per molecule of alcohol. Specific telomer alcohols useful in this invention include those obtained by reacting tetrafluoroethylene with methanol, ethanol, propanol and isopropanol. The number of tetrafluoroethylene units (i. e., —$CF_2$—$CF_2$—) in the telomer alcohol may vary from one to about four, thus giving telomer alcohols containing from 3 carbon atoms (methanol plus 1 tetrafluoroethylene unit) to 11 carbon atoms (propanol+4 tetrafluoroethylene units).

Camphoric acid contains two asymmetric carbon atoms and therefore has 4 optical isomers. Any one of these isomers or either of the dl mixtures are operable in this invention. In addition, camphoric acid may exist as the cis or trans isomer and either one or a mixture of both of these forms may be used.

The esterification process involving the fluorotelomer alcohol and the camphoric acid is carried out by conventional techniques. For example, the fluorotelomer alcohol, the camphoric acid and an acid catalyst may be heated in xylene or other hydrocarbon or halocarbon solvent. The water of reaction is removed as the solvent refluxes. The solvent and excess alcohol are then removed by vacuum distillation, the residue cooled, washed with dilute alkali to remove any remaining acid and the product purified by distillation. The product thus obtained is normally a clear, colorless or light yellow oil.

Alternately, the product need not be distilled from the reaction vessel but can be purified by conventional techniques. For example, impurities may be removed by solvent extraction, washing, adsorption on solid substrates, and the like.

As indicated the esterification may be carried out with the aid of an acid catalyst; normally, a strong acid such as sulfuric, hydrochloric, p-toluene sulfonic, or perfluorobutyric acid is used. Mixtures of strong acids are also useful.

As pointed out above, the compounds of this invention have the empirical formula:

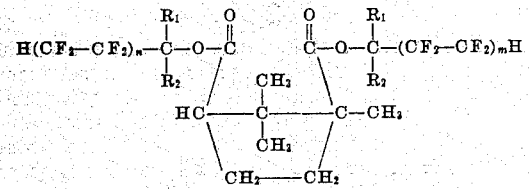

where $R_1$ and $R_2$ is a hydrogen atom, or a methyl or ethyl group and the number of carbon atoms of the sum of $R_1$ and $R_2$ is not greater than 2; $n$ and $m$ are integers whose sum is from 4 to 8. When the sum of $n+m$ is less than 4, the compounds are too volatile for use in high temperature systems. On the other hand, when $n$ and $m$ exceeds about 8, the products are solids at room temperature and cannot function as oils over the range of temperatures required. Neither the R groups nor $n$ and $m$ need be the same; that is, the diester is not necessarily composed of identical alcohol components. Mixed esters are included in this invention. These are preferably made by esterifying the camphoric acid with a mixture of telomer alcohols. Alternately, the monoester of the camphoric acid can be made with 1 mole of one alcohol and 1 mole of camphoric acid, and the remaining carboxy group then esterified in a second step with a different telomer alcohol.

When camphoric acid esters are made by esterifying camphoric acid in a single step with a mixture of two or more telomer alcohols a mixture of mixed esters can be obtained and such a mixture is included in this invention. Preferably, a mixture of telomer alcohols containing 5, 7 and 9 carbon atoms is reacted with the camphoric acid to yield such a mixture of mixed esters. This product mixture is particularly useful as a lubricant for gas turbines, steam turbines, high temperature transmission fluids, heat transfer agents and the like. Since the physical properties of such a mixture of mixed esters do not differ significantly from the pure components, it is economically preferable to prepare and use such mixtures, because the steps of isolating pure intermediates (both telomer alcohol mixtures and product esters) are not required.

The compounds of this invention may be called camphorates and named as hydrogen containing perfluoroalkyl camphorates. Thus the compound $$H(CF_2-CF_2)_2-CH_2-O-\overset{O}{\underset{\|}{C}}-R-\overset{O}{\underset{\|}{C}}-O-CH_2-(CF_2-CF_2)_2H$$

where R is the dl camphoric acid residue, is di-(1,1,5-trihydroperfluoropentyl)-dl-camphorate. Other compounds exemplifying this nomenclature and compounds falling within the scope of this invention are di-(1,1,9-trihydroperfluorononyl) - d - camphorate, 1,1,3 - trihydroperfluoropropyl(1,1,11 - trihydroperfluoroundecyl) - dl-camphorate, and di - (1,1,9 - trihydro - 2 - dimethylperfluorononyl)-d-camphorate.

EXAMPLES AND COMPARISONS

Example 1

A reaction mixture of 200 parts (1 mole) of dl-camphoric acid (cis isomers), 730 parts (2.2 moles) of 1,1,7-trihydroperfluoroheptyl alcohol and 8 parts (0.05 mole) of p-toluene sulfonic acid catalyst in about 450 parts of xylene was refluxed with continuous separation of water from the condensate. After 72 hours, 38 parts of water was separated and the solvent and excess alcohol removed by vacuum distillation. The residue was cooled, washed with three 1000-part portions of 1.75% aqueous KOH solution. About 50 parts of Filter-cel[1] was added, the mixture stirred for one hour and then filtered. The press-cake was washed with a small amount of benzene to remove any occluded product. The filtrate was treated with 50 parts of activated alumina (8 to 14 mesh) and 25 parts of Nuchar C and after heating at 175° C. for 2½

[1] "Filter-cel" is a diatomaceous earth available from the Johns-Manville Corporation.

hours under 1 to 5 mm. pressure, the mixture was cooled and filtered. The liquid product consisted of 396 parts of a clear, light yellow oil boiling at 361° C. and having an acid number of 0.11.

Example 2

A mixture of 200 parts of dl-camphoric acid, 750 parts of 1,1,7-trihydroperfluoroheptyl alcohol, and 10 parts of p-toluene sulfonic acid catalyst and 10 parts of perfluorobutyric acid was refluxed in about 200 parts of toluene. During the reflux period, the water of reaction was continuously removed. After 76 hours, 38 parts of water had been separated and the reaction mixture was cooled and washed twice as in Example 1 with 1000-part portions of 2% KOH solution. The organic layer was distilled to recover the solvent and the residue fractionated through a 4-inch Vigreaux type column to obtain 702 parts of light yellow viscous product boiling at 174–180° C. at 0.9 mm. pressure.

Example 3

A mixture of 200 parts of d-camphoric acid, 820 parts of 1,1,7-trihydroperfluoroheptyl alcohol and 5.5 parts of sulfuric acid (specific gravity 1.84) was refluxed in about 475 parts of carbon tetrachloride for 44 hours during which time 17 parts of water separated. The mixture was cooled and washed twice with 1000-part portions of 2% KOH solution and fractionally distilled to obtain 450 parts of practically colorless liquid product boiling at 174–177° C. at 0.8 mm. pressure.

Example 4

A mixture of 200 parts of dl-camphoric acid (1 mole), 440 parts of 1,1,9-trihydroperfluorononyl alcohol (0.92 mole), 10 parts of p-toluene sulfonic acid and 10 parts of perfluorobutyric acid was refluxed in about 200 parts of xylene until no more water separated. Then, 360 parts of 1,1,7-trihydroperfluoroheptyl alcohol (0.94 mole) was added and refluxing continued for a total of 136 hours. In this way 32 parts of water was removed from the reaction mixture. After cooling, the product was washed twice with 1000-part portions of 2% aqueous KOH solution and the product distilled to obtain 743 parts of light yellow colored mixed ester boiling at 180–201° C. at 0.8 mm. A micro boiling point determination indicated a boiling point of 364° C.

Example 5

A mixture of 200 parts of dl-camphoric acid (1 mole), 432 parts of 1,1,9-trihydroperfluorononyl alcohol (1.0 mole), and 10 parts of p-toluene sulfonic acid and 10 parts of perfluorobutyric acid was refluxed in about 200 parts of toluene until no more water separated. Then a mixture of 180 parts of 1,1,7-trihydroperfluoroheptyl alcohol (.54 mole) and 125 parts of 1,1,5-trihydroperfluoropentyl alcohol (0.54 mole) was added and heating was continued to a total of 136 hours during which time 34 parts separated. The mixture was cooled, washed with two 1000-part portions of 2% aqueous KOH solution and fractionally distilled to obtain 541 parts of light yellow liquid product boiling at 173–201° C. at 0.75 mm. A micro boiling point indicated 374° C.

Example 6

A mixture of 325 parts of 1,1,2,6-tetrahydro-2-methyl-perfluorohexanol-1 (1.3 mol), 100 parts of dl-camphoric acid (0.5 mol), and 10 parts of concentrated sulfuric acid was refluxed in about 250 ml. of carbon tetrachloride for 120 hours during which time 5 cc. of water was removed. The mixture was cooled, extracted twice with 1 liter portion of 2% aqueous KOH solution and distilled to obtain 22 parts of light yellow liquid product distilling at 166–171° C. at 0.9 mm.

Example 7

The details of Example 2 were repeated, but with isocamphoric acid (a trans isomer). A light yellow product was obtained boiling at 169° C. at 0.5 mm. pressure of mercury.

Example 8

The details of Example 2 were repeated using dl-camphoric acid and the 5 carbon atom alcohol obtained from isopropanol and tetrafluoroethylene. The light yellow liquid product boiled at 166-171° C. at 0.95 mm., had a viscosity of 705.7 at 100° F., and had a pour point of +45° F. When held at 400° F. in an open dish, only 44% evaporated.

The following table, Table I, lists some physical properties of several camphorate esters prepared from the telomer alcohols obtained from methanol and tetrafluoroethylene and camphoric acid according to the methods exemplified above:

TABLE I

| Camphorate diester from— | Viscosity (Cs.)[1] | | Viscosity Index (ASTM-D-567) | ASTM Slope (100-210° F.) | Temp. at which fluid has viscosity of 1 Cs., ° F. | Temp. at which fluid has viscosity of 10,000 Cs., ° F. | Volatility at 400° F. | | ASTM Pour Point, ° F. |
|---|---|---|---|---|---|---|---|---|---|
| | 210° F. | 100° F. | | | | | (2 Hrs. Open Cup) | (6½ Hrs. MIL Test)[1] | |
| d-camphoric acid and $C_7$ telomer alcohol | 8.32 | 116.8 | +1.4 | 0.86 | 425 | +10 | 26 | 63 | <−20 |
| dl-camphoric acid and: | | | | | | | | | |
| $C_5$ telomer alcohol | 6.50 | 80.1 | −28 | 0.89 | 400 | +2 | | | <−20 |
| $C_7$ telomer alcohol | 8.15 | 113.9 | −1.8 | 0.86 | 420 | +10 | 23 | 61 | <−20 |
| $C_9$ telomer alcohol | 11.3 | 201.4 | +1.5 | 0.84 | 455 | | 8.5 | 28 | +95 (M. P.) |
| dl-camphoric acid and telomer alcohols in two step reaction: | | | | | | | | | |
| $C_5+C_9$ telomer alcohol | 8.53 | 124.1 | −2.1 | 0.86 | 425 | +15 | 37 | 67 | <−20 |
| $C_7+C_9$ telomer alcohol | 9.22 | 142.6 | −1.9 | 0.86 | 430 | +20 | 29 | 39 | −15 |
| $C_9$+mixture of $C_5$ and $C_7$ telomer alcohols | 8.93 | 134.4 | −1.3 | 0.86 | 430 | +17 | 34 | 45 | <−20 |

[1] MIL-L-7808 B Test.

Example 9.—Hydrolytic stability

The unexpected superiority of hydrolytic stability of the camphoric acid esters of this invention is exemplified by the comparisons given in Table 2. Hydrolytic stability was evaluated by determining the amount of saponification obtained when subjected to hydrolysis by ASTM method D94-52T. This method involves refluxing the compound in the presence of alkali for a given time (4 and 24 hours) and then titrating the remaining alkali to determine the amount of alkali used in the saponification, from which is determined the amount of ester hydrolyzed.

Example 10.—Volatility

The camphoric acid esters of this invention show excellent volatility characteristics; i. e., on continued use at high temperatures, the oils do not evaporate significantly.

TEST PROCEDURE—TWO HOUR 400° F. EVAPORATION TEST

Determination of the volatility of candidate fluids for high temperature applications.

*Apparatus.*—Aluminum foil, hot plate and Variac 3" x 6" copper plate with attached thermocouple, temperature indicator.

PROCEDURE

Small flat dishes 1½" in diameter by ⅜" deep are fashioned from the aluminum foil using a suitable form. These dishes are weighed to 0.1 mg., then about 1 gm. of the oil sample is placed therein and reweighed to 0.1 mg.

The dishes containing the samples are then placed on the hot copper plate regulated to 400° F. by means of the variac controlled hot plate and allowed to remain for two hours.

This test is best carried out in a well-ventilated hood to remove any noxious or toxic fumes and to provide a circulating atmosphere above the sample surface. At the end of the two-hour test period the samples are removed and the dishes reweighed as before.

*Results.*—The sample weight loss is determined and is reported as percent evaporation in the following table:

TABLE II
HYDROLYTIC STABILITY, VOLATILITY AND OXIDATIVE STABILITY CHARACTERISTICS

| Compound | Percent Saponified After— | | Percent Volatility | Oxidative Corrosion Copper Weight Loss (mg./cm.²) |
|---|---|---|---|---|
| | 4 hrs. | 24 hrs. | | |
| Diester obtained from: | | | | |
| 1,1,5-tri-hydroperfluoropentyl alcohol and dl-camphoric acid | 32 | 52 | 96 | −0.6 |
| 1,1,5-tri-hydroperfluoropentyl alcohol and pinic acid | 84 | 98 | [2] >95 | −1.0 |
| 1,1,7-tri-hydrofluoro-heptyl alcohol and dl-camphoric acid | 42 | 50 | 35 | −0.2 to −0.6 |
| 1,1,7-tri-hydrofluoroheptyl alcohol and pinic acid | 86 | 96 | 56 | |
| 1,1,7-tri-hydrofluoroheptyl alcohol and 3-methyl glutaric acid | 100 | | 81 | |
| 1,1,9-tri-hydroperfluorononyl alcohol and dl-camphoric acid | 35 | 54 | 8.5 | −0.3 |
| 1,1,9-tri-hydroperfluorononyl alcohol and pinic acid | 98 | 100 | 24 | −0.5 |
| 1,1,5-trihydroperfluoropentyl 1,1,7-trihydroperfluoroheptyl 1,1,9-trihydroperfluorononyl alcohol and dl-camphoric acid | 32 | 53 | 34 | −0.4 |
| 1,1,5-trihydroperfluoropentyl 1,1,7-trihydroperfluoroheptyl 1,1,9-trihydroperfluorononyl alcohol and pinic acid [1] | 96 | 100 | 46 | −0.9 |

[1] Diester prepared by esterifying 1 mole of the acid with 1 mole of the $C_9$ telomer alcohol and then esterifying the monoester with a mixture of 0.5 mole each of the $C_5$ and $C_7$ telomer alcohols.

[2] Tarry residue remained in dish giving erroneous value, and showing poor stability.

Example 11.—Lubricity characteristics

The excellent lubricity of the compounds of this invention is shown by the following data. Comparison is made with a "standard sample" which is a conventional jet engine lubricant identified as Esso Turbo Oil #15.

TEST PROCEDURE—LOAD CARRYING ABILITY—FALEX TEST
(Ref.: E. G. Ellis, "Lubricant Testing"; 1953, page 153)

The "rapid Falex test" is used to indicate the load carrying ability of candidate stable lubricants. Essentially the test involves the failure of an oil to carry a load as evidenced by the seizure of the test pin and bushings or a sudden increase in torque reading.

*Apparatus.*—Falex test machine, test bushings and pins.

PROCEDURE

After proper insertion of the test pieces, the sample reservoir is filled with about 50 ml. of the fluid to be tested and placed in position such that the fluid completely covers the test pieces. The jaw-load is adjusted to 250 pounds and the torque gauge linkage adjusted to 0. The machine is started and following a 3-minute run-in period during which time the load is maintained constant, the automatic loading device is engaged. The load at which the torque reading shows a sudden increase and/or seizure occurs is recorded as the maximum load held.

*Results.*—For best interpretation, the test should be compared to a "standard sample" run in the same way and whose behavior is known in prototype equipment.

TEST RESULTS

| Compound Tested | Falex Test Data | |
| --- | --- | --- |
| | Max. Jaw-Load at Seizure (lbs.) | Max. Bushing Temp. (° F.) |
| Di(1,1,7-trihydroperfluoroheptyl) camphorate | >4,500 | 430 |
| Esso Turbo Oil #15 | 1,530 | 285 |

The lubricity of the other camphorate esters of this invention is essentially the same as that of di(1,1,7-trihydroperfluoroheptyl) camphorate.

Example 12.—Oxidative corrosion

The oxidative stability of lubricants and simultaneous corrosive effect on metals is measured by the following test:

24-HOUR, 500° F. OXIDATION CORROSION TEST

*Apparatus.*—Glass reaction cell-condenser assembly, flowmeter and air-drying train, metal bath thermostat, metal test strip of copper, polishing apparatus and materials.

PROCEDURE

The metal test strip is cleaned initially with dilute nitric acid and distilled water followed by polishing with fine emery paper and steel wool. It is again washed with water, acetone and air-dried. After weighing to the nearest 0.1 mg., it is placed on the reaction cell with 10–15 ml. of fluid to be tested. The condenser is attached and the entire assembly is placed in the 500° F. metal bath. The air flow is adjusted to about 25 ml./min. and checked occasionally to insure this rate of flow.

After 24 hours, the cell-condenser assembly is removed and allowed to cool. The metal test strip is removed, washed in acetone and polished with glass wool, rewashed in acetone and reweighed to 0.1 mg.

*Results.*—The weight change of the metal strip is reported in mg./cm.$^2$ (—=loss, +=gain). The oil sample is examined for color changes, insolubles, suspensions, 100° F. viscosity change and final neutralization number. The results are shown in Table II and demonstrate significant oxidative stability for the camphorate esters of this invention.

Example 13.—Evaluation in test engine

Di(1,1,7-trihydroperfluoroheptyl) camphorate was evaluated as a lubricant in a Co-operative Oil test gasoline engine equipped with a radioactive top piston ring. This test method is essentially that described in U. S. 2,315,845. The engine was operated under the following conditions which represent steady, high speed, high load operation to increase wear due to lack of lubrication:

| | |
| --- | --- |
| Time | 20 hrs. |
| Engine R. P. M. | 1800. |
| Throttle | Wide open. |
| Air-fuel ratio | 13.5:1. |
| Spark advance | 20° |
| Coolant outlet, temp | 200° F. |
| Oil sump, temp | 150° F. |

On determining wear by measuring loss of radioactivity in the top piston ring, it was found that the wear rate was only 0.035 mg. of iron per hour. This compares favorably with the best of other conventional lubricants.

As can be seen from the above data, the camphorate esters of this invention have very superior advantages over fluids now used for high temperature lubricants. This superiority makes for their use in various high temperature applications. For example, when used as lubricants in steam turbines, conventional lubricants fail because of their poor hydrolytic stability, but the camphorate esters are capable of giving prolonged lubrication without hydrolysis. Conventional lubricants used in steam turbines have a further disadvantage in that many of them have low ignition temperatures. The camphorate esters will not ignite readily.

In jet aircraft and in rockets and missiles, the camphorate esters find utility because of their high temperature stability. At supersonic air speeds the friction between the air and the aircraft results in exceedingly high temperatures. These high temperatures in turn cause evaporation and degradation of liquids used as lubricants and in the hydraulic systems of the aircraft. The camphorate esters of this invention can withstand these high temperatures without evaporation loss or decomposition. Because of transitions from high to low temperatures during flight, condensation of atmospheric water vapor occurs which tends to cause hydrolysis of conventional high temperature lubricants. Even small amounts of hydrolysis are dangerous because the degradation products cause corrosion and quickly interferes with lubricity, often causing failure of the system involved. The camphorate esters of this invention overcome this difficulty due to their excellent resistance to hydrolysis.

We claim:

1. The compound

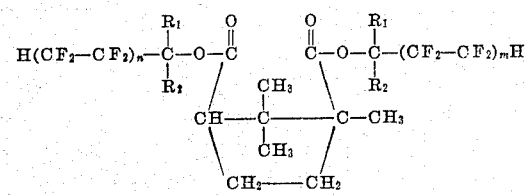

wherein $R_1$ and $R_2$ are taken from the group consisting of H, $CH_3$ and $C_2H_5$; the sum of the carbon atoms in $R_1$ and $R_2$ in each of the two ester groups is not greater than 2; and, $n$ and $m$ are integers whose sum is from 4 to 8.

2. The compound of claim 1 wherein the sum of the carbon atoms in $R_1$ and $R_2$ in each of the two ester groups is 2; the integer $n$ is 2; and, the integer $m$ is 2.

3. A high temperature lubricating oil which is the fluorotelomer alcohol diester of camphoric acid produced by reacting camphoric acid with a mixture of fluorotelomer alcohols, said alcohols having 5, 7 and 9 carbons, respectively, said camphoric acid diesters having the general formula

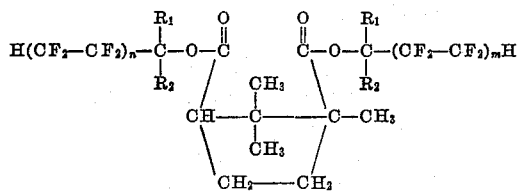

wherein $R_1$ and $R_2$ are taken from the group consisting of H, $CH_3$ and $C_2H_5$; the sum of the carbon atoms in $R_1$ and $R_2$ in each of the two ester groups is not greater than 2; and, $n$ and $m$ are integers whose sum is from 4 to 8.

4. A high temperature lubricating oil which is a mixture of fluorotelomer alcohol diesters of camphoric acid, said camphoric diesters having the general formula

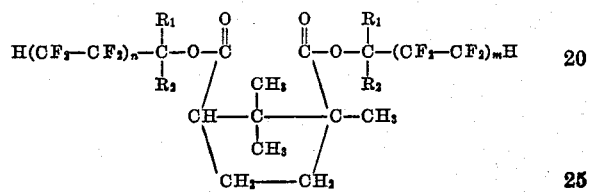

wherein $R_1$ and $R_2$ are taken from the group consisting of H, $CH_3$ and $C_2H_5$; the sum of the carbon atoms in $R_1$ and $R_2$ in each of the two ester groups is not greater than 2; and, $n$ and $m$ are integers whose sum is from 4 to 8.

References Cited in the file of this patent
UNITED STATES PATENTS

| | | |
|---|---|---|
| 2,559,628 | Joyce | July 10, 1951 |
| 2,679,509 | Hasselstrom | May 25, 1954 |
| 2,765,334 | Stinson et al. | Oct. 2, 1956 |